US010334445B2

(12) United States Patent
Hooda et al.

(10) Patent No.: US 10,334,445 B2
(45) Date of Patent: Jun. 25, 2019

(54) ACCURATE DETECTION OF ROGUE WIRELESS ACCESS POINTS

(71) Applicant: Cisco Technology, Inc., San Jose, CA (US)

(72) Inventors: Sanjay Kumar Hooda, Cupertino, CA (US); Poon Kuen Leung, Sunnyvale, CA (US); Liu Huang, Pleasanton, CA (US); Vishwas Vijendra Bhat, Fremont, CA (US); Shweta Arvind Saraf, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 14/882,700

(22) Filed: Oct. 14, 2015

(65) Prior Publication Data

US 2017/0111360 A1   Apr. 20, 2017

(51) Int. Cl.
| H04L 29/06 | (2006.01) |
| H04W 12/12 | (2009.01) |
| H04W 88/16 | (2009.01) |
| H04W 12/10 | (2009.01) |
| H04W 84/12 | (2009.01) |

(52) U.S. Cl.
CPC ............ *H04W 12/12* (2013.01); *H04W 12/10* (2013.01); *H04W 84/12* (2013.01); *H04W 88/16* (2013.01)

(58) Field of Classification Search
CPC ........ H04L 63/10; H04W 48/16; H04W 88/16
See application file for complete search history.

(56) References Cited

U.S. PATENT DOCUMENTS

| 7,333,481 B1 | 2/2008 | Rawat et al. |
| 7,336,670 B1 | 2/2008 | Calhoun et al. |
| 7,370,362 B2 | 5/2008 | Olson et al. |

(Continued)

OTHER PUBLICATIONS

H. Chaskar et al., "Drawbacks of Wireside-Only Rogue Detection", AirTight Networks, Aug. 26, 2009, 4 pages.

(Continued)

*Primary Examiner* — Brandon S Hoffman
*Assistant Examiner* — Nega Woldemariam
(74) *Attorney, Agent, or Firm* — Edell, Shapiro & Finnan, LLC (57) ABSTRACT

A computer-implemented method is provided for a management entity to detect where a rogue access point is connected to the network infrastructure. The management entity receives from a wireless network controller an indication of an unauthorized frame wirelessly intercepted by an authorized access point. The unauthorized frame carries data between a rogue access point and a wireless client device. The rogue access point is connected to a compromised network element in a managed network at a compromised port of the compromised network element. The management entity extracts a client network address and a gateway network address from the indication of the unauthorized frame. The management entity traces a path through the managed network from a gateway network element associated with the gateway network address to the compromised network element. The management entity determines the compromised port in the compromised network element at which the rogue access point is connected.

20 Claims, 8 Drawing Sheets

(56) References Cited

U.S. PATENT DOCUMENTS

| | | |
|---|---|---|
| 7,970,894 B1 | 6/2011 | Patwardhan |
| 2005/0125693 A1* | 6/2005 | Duplessis ........... H04L 63/0428 726/4 |
| 2008/0101283 A1* | 5/2008 | Calhoun ................ H04L 63/10 370/328 |

OTHER PUBLICATIONS

John Louis Vigo Jr., "Wireless Intrusion Detection System", University of New Orleans, ScholarWorks@UNO, Dissertations and Theses, Dec. 17, 2004, 77 pages.

\* cited by examiner

| INTERFACE / PORT | NEIGHBOR MAC |
|---|---|
| PORT A | S-MAC-430 |
| PORT B | S-MAC-436 |
| PORT C | GW-MAC |

510 — PORT A row
520 — PORT B row
530 — PORT C row

ACCURATE DETECTION OF ROGUE WIRELESS ACCESS POINTS

TECHNICAL FIELD

The present disclosure relates generally to securing network infrastructure from rogue wireless access points.

BACKGROUND

Wireless access points provide an entry point for wireless devices to access a managed network infrastructure. A rogue access point that is connected to the network may allow malicious actors an "attack" vector into the managed network infrastructure. Detecting rogue access points may be necessary to protect network infrastructure and wireless clients accessing the managed network.

One algorithm to detect whether a rogue access point is connected to the network uses a legitimate access point as a client and tries to associate with the rogue access point. If the legitimate access point's identity is seen from the wireless network controller, then the rogue access point is connected to the network. However, encrypted authentication protocols used by the rogue access point may hinder the effectiveness of detection algorithms that rely on associating with the rogue access point.

Another algorithm uses a dedicated access point running in a rogue detector mode. In this algorithm, the rogue detector mode causes the access point to listen to Address Resolution Protocol (ARP) message and try to match a rogue access point's network address. However, if the rogue access point uses a Network Address Translation service, then the rogue detector mode may not find the matching network address. Additionally, using an access point solely for rogue access point detection may waste resources that a customer would prefer to use for other purposes.

DESCRIPTION OF EXAMPLE EMBODIMENTS

Overview

A computer-implemented method is provided for a management entity to detect where a rogue access point is connected to the network infrastructure. The method comprises receiving from a wireless network controller an indication of an unauthorized frame wirelessly intercepted by an authorized access point. The unauthorized frame carries data between a rogue access point and a wireless client device. The rogue access point is connected to a compromised network element in a managed network at a compromised port of the compromised network element. The management entity extracts a client network address and a gateway network address from the indication of the unauthorized frame. The management entity traces a path through the managed network from a gateway network element associated with the gateway network address to the compromised network element. The management entity determines the compromised port in the compromised network element at which the rogue access point is connected.

Example Embodiments

Typical algorithms for rogue access point detection achieve a relatively poor detection rate (~30%) and often require additional sensors or marker packets that may reduce the availability of wireless network resources. The techniques presented herein increase the detection accuracy greatly (95%+) and do not require additional sensors. Additionally, the techniques presented herein do not use additional bandwidth (e.g., marker packets) and use the unencrypted portion of encrypted connections between a rogue access point and a wireless client. The rogue detection algorithm uses multiple network characteristics and correlates data from the wired and wireless sides to accurately detect and block the rogue access point.

In one example, the rogue detection algorithm monitors packets from a client connected to the rogue access point, and then uses the size of the packet on the Ethernet side to correlate and do a network connectivity test. This test may be used to confirm that a rogue access point using network address translation is connected to the network infrastructure.

Some networks deploy wired and wireless network infrastructure on separate switches. In this scenario, finding the wired side of a rogue access point may be challenging. The techniques presented herein are not dependent on where the detecting access point and the rogue access point are connected relative to each other. Additionally, when the wired and wireless ports are separate and the wireless media is encrypted, there is no way to find the IP address in the wireless packets, which can cause some rogue detection algorithms to fail.

Figure 1:
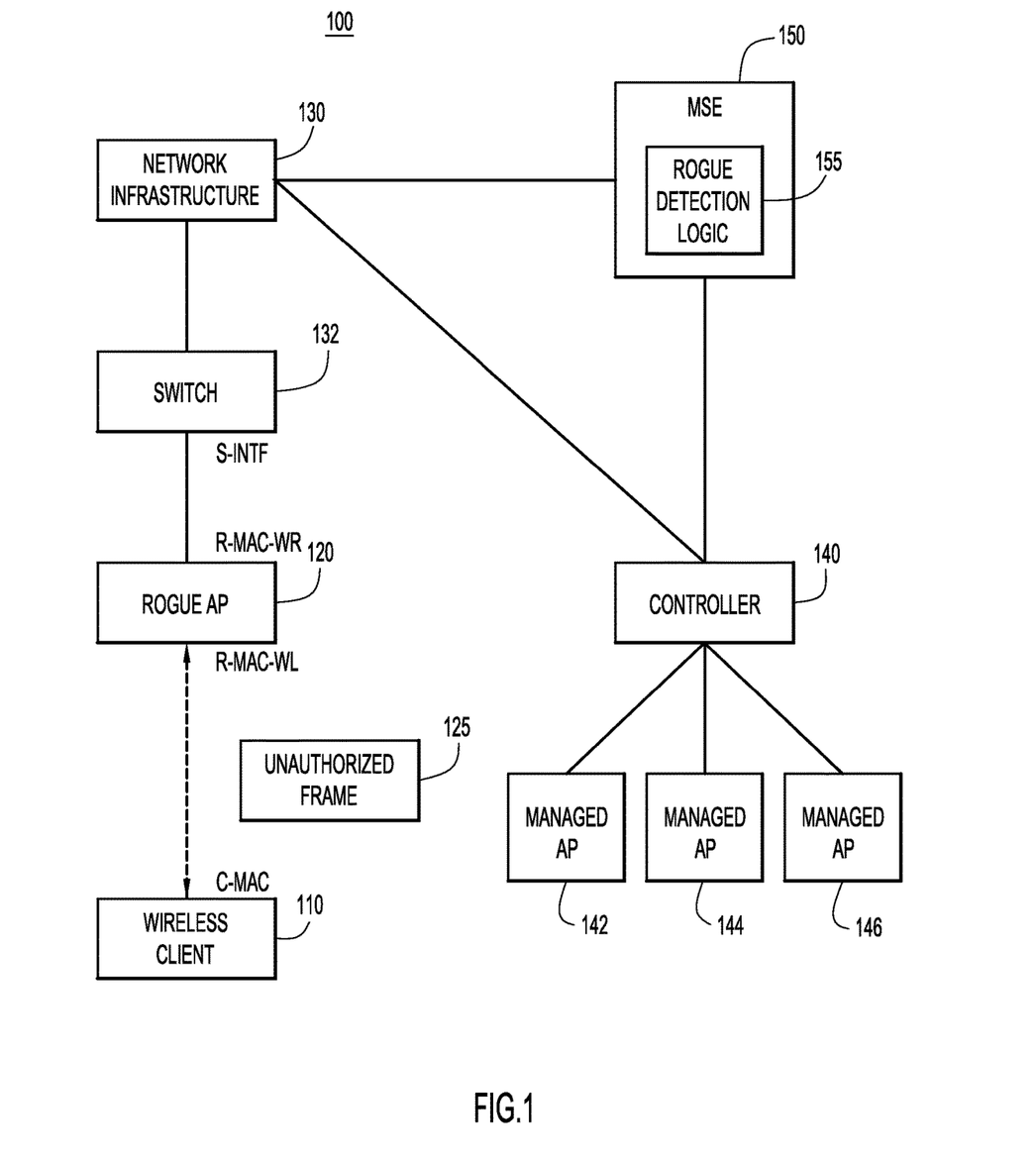
FIG. 1 shows a rogue access point detection system, according to an example embodiment.

Referring now to FIG. 1, a simplified block diagram of a rogue detection system 100 is shown. A wireless client device 110 associates with a rogue access point 120. One or more unauthorized wireless frames 125 may be exchanged between the wireless client 110 and the rogue access point 120. The rogue access point 120 is connected to the network infrastructure 130 through a switch 132. A wireless local area network (WLAN) controller 140 manages wireless access to the network infrastructure 130 through managed access points 142, 144, and 146. A management entity 150 (e.g., a Mobility Services Engine) is connected to the network infrastructure 130 and the WLAN controller 140. The management entity 150 uses rogue detection logic 155 to determine the port (e.g., switch interface) that the rogue access point 120 is using to connect to the compromised switch 132.

In one example, the wireless client device 110 has a wireless interface that uses a Media Access Control (MAC) address of C-MAC to connect to the rogue access point 120. The rogue access point 120 includes a wireless interface with a MAC address of R-MAC-WL and a wired network interface with a MAC address of R-MAC-WR. The two MAC addresses of the rogue access point 120 may or may not be related. For example, R-MAC-WL may be within a few values of R-MAC-WR. Alternatively, the rogue access point 120 may use completely unrelated values for R-MAC-WL and R-MAC WR. The techniques presented herein utilize the client MAC address and the gateway MAC address present in the wireless header of unauthorized frame 125. Using this information, a correlation is made where the wired interface S-INTF on which the rogue AP connects is pin-pointed. The rogue access point 120 connects to the switch 132 through a compromised interface S-INTF, which the rogue detection logic 155 identifies and disables.

In another example, the frame 125 is wirelessly overheard by a managed access point 142, and the controller 140 determines that it is an unauthorized frame. The unauthorized frame 125 may be directed from the rogue access point 120 to the wireless client 110 or it may be directed from the wireless client 110 to the rogue access point 120. The controller 140 may determine that the frame 125 is unauthorized based upon the MAC address listed in the header of frame 125, e.g., if the MAC address is associated with any of the managed access points 142, 144, or 146.

The rogue detection logic 155 in the management entity 150 uses the controller 140 and the managed access points 142, 144, and 146 to overhear the unauthorized frame 125. From the header of the unauthorized frame 125, the management entity 150 discovers the MAC addresses of the wireless client device 110, the wireless MAC of the rogue access point 120, and the MAC address of the level-2/level-3 gateway network element in the network infrastructure 130.

Figure 2:
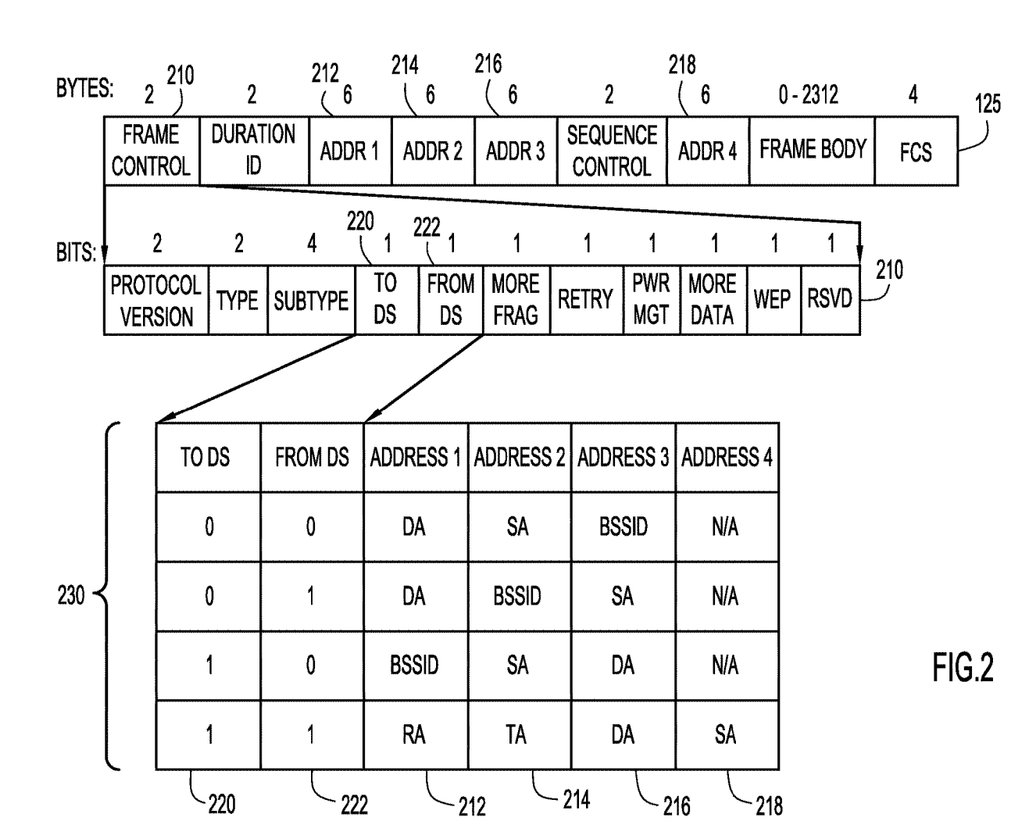
FIG. 2 is a block diagram of an unauthorized frame that may be used to detect where a rogue access point is connected to the network infrastructure, according to an example embodiment.

Referring now to FIG. 2, a block diagram of an example of an unauthorized frame 125 is shown. Frame 125 includes two bytes of frame control 210, as well as four network addresses 212, 214, 216, and 218 that are associated with the frame 125. The network addresses 212, 214, 216, and 218 each may be six bytes in length according to one example. Other fields may be included in the frame, including a duration identifier field, a sequence control field, a variable length frame body containing data, and a frame check sequence. The frame control field 210 includes bits to signal aspects of the frame, including "To DS" bit 220 to indicate whether the frame is designated for the distribution system (e.g., network infrastructure 130) and "From DS" bit 222 to indicate whether the frame originated from the distribution system.

As shown in table 230, the actual address in each of the network address fields 212, 214, 216, and 218 may depend on the values of the "To DS" bit 220 and the "From DS" bit 222. If the "To DS" bit 220 is set and the "From DS" bit 222 is unset, then the network address 212 includes the wireless network address of the rogue access point 120 (e.g., R-MAC-WL), the network address 214 includes the source address of the wireless client device 110 (e.g., C-MAC), the network address 216 includes the destination address of the gateway network element (not shown in FIG. 1), and the network address 218 is unused.

Similarly, if the frame 125 is directed toward the wireless client device 110 from the rogue access point 120 (e.g., the "To DS" bit 220 is unset and the "From DS" bit 222 is set), then the packet header includes the network address for the wireless client device 110 (e.g., C-MAC), the wireless network address of the rogue access point 120 (e.g., R-MAC-WL), and the source network address of the gateway network element as the network addresses 212, 214, and 216, respectively. The network address 218 is unused.

Figure 3A:
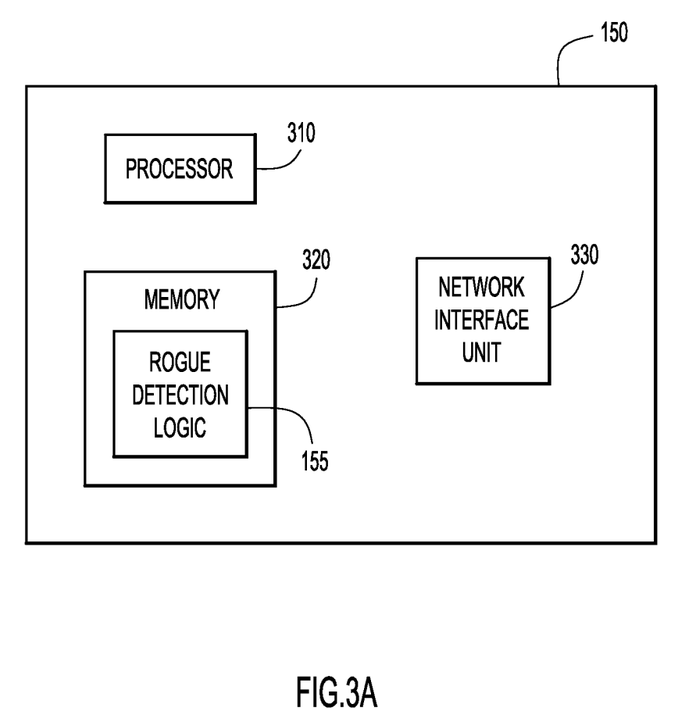
FIG. 3A is a simplified block diagram of a management entity to implement a rogue access point detection system, according to an example embodiment.

Referring now to FIG. 3A, a simplified block diagram shows an example of a management entity 150. The management entity 150 includes a processor 310 to process instructions relevant to the operations of the device, and memory 320 to store a variety of data and software instructions (e.g., mobility services data, network topology data, rogue detection logic 155, etc.). The management entity 150 also includes a network interface unit 330 configured to communicate with computing devices and network elements over a network. The network may include a wireless network, a wired network, a local area network, a wide area network, and/or other types of networks configured to communicate data between computing devices.

Memory 320 may include read only memory (ROM), random access memory (RAM), magnetic disk storage media devices, optical storage media devices, flash memory devices, electrical, optical, or other physical/tangible (e.g., non-transitory) memory storage devices. The processor 310 is, for example, a microprocessor or microcontroller that executes instructions for implementing the processes related to the location detection described herein. Thus, in general, the memory 320 may include one or more tangible (non-transitory) computer readable storage media (e.g., a memory device) encoded with software (e.g., the network path selection logic) comprising computer executable instructions and when the software is executed (by the processor 310) it is operable to perform the operations described herein.

Figure 3B:
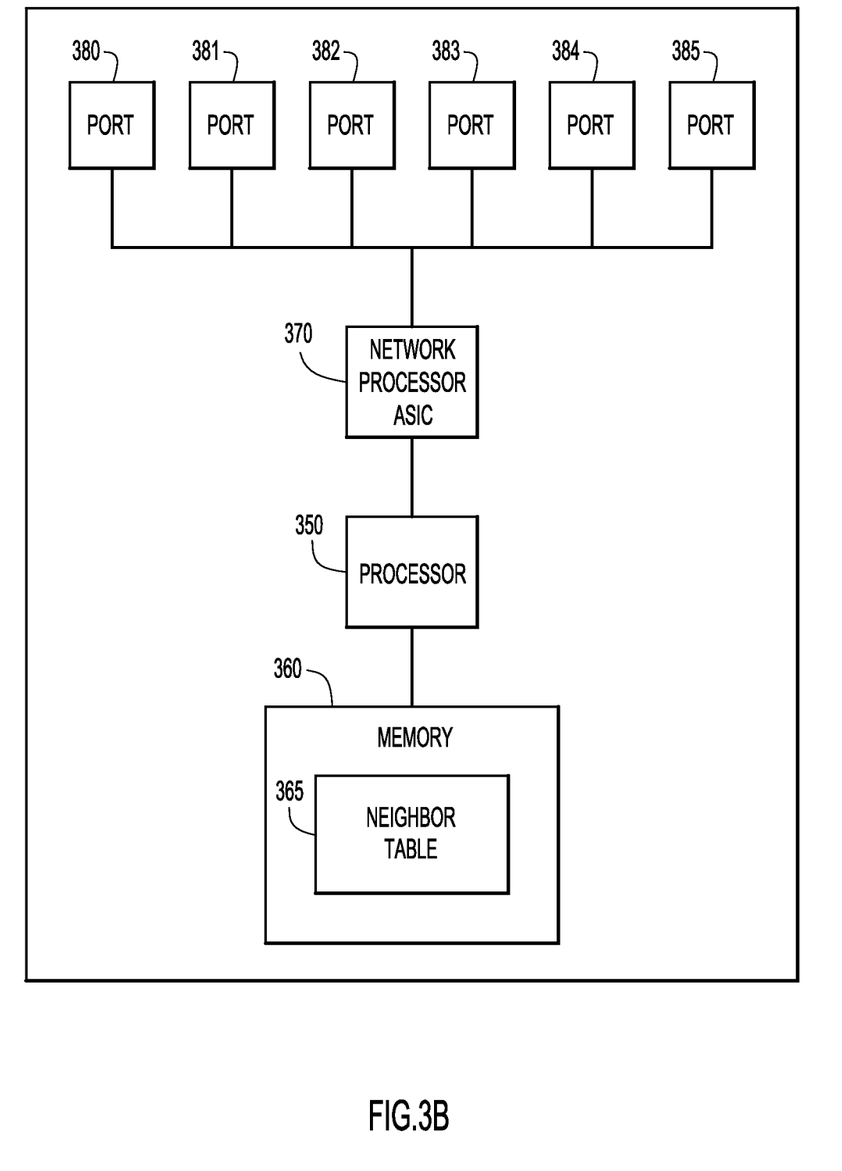
FIG. 3B is a simplified block diagram of a network element in the managed network, according to an example embodiment.

Referring now to FIG. 3B, a simplified block diagram of a network device 132 configured to perform the techniques presented herein is shown. Network device 132 is used as an example, and other network element in the network infrastructure 130 may have similar configurations. Network device 132 includes, among other possible components, a processor 350 to process instructions relevant to processing communication packets, and memory 360 to store a variety of data and software instructions (e.g., Neighbor table 365, communication packets, etc.). The network device 132 also includes a network processor application specific integrated circuit (ASIC) 370 to process communication packets that flow through the network element 132. Network processor ASIC 370 processes communication packets be sent to and received from ports 380, 381, 382, 383, 384, and 385. While only six ports are shown in this example, any number of ports may be included in network element 132.

Memory 360 may include ROM, RAM, magnetic disk storage media devices, optical storage media devices, flash memory devices, electrical, optical, or other physical/tangible (e.g., non-transitory) memory storage devices. The processor 350 is, for example, a microprocessor or microcontroller that executes instructions for implementing the processes described herein. Thus, in general, the memory 360 may comprise one or more tangible (non-transitory) computer readable storage media (e.g., a memory device) encoded with software comprising computer executable instructions and when the software is executed (e.g., by the processor 350) it is operable to perform the operations described herein.

Figure 4:
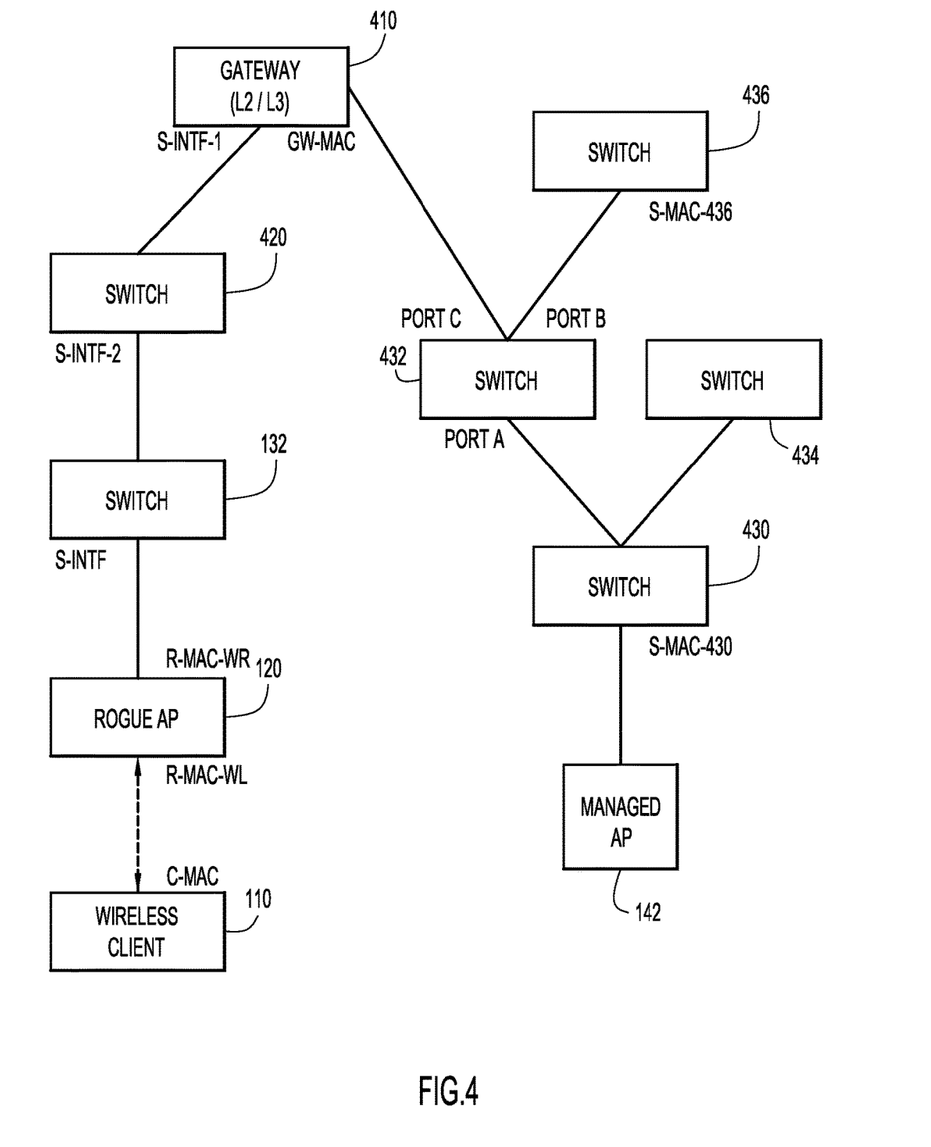
FIG. 4 is a system diagram showing the interfaces used to track the rogue access point from the gateway network element, according to an example embodiment.

Referring now to FIG. 4, a simplified block diagram shows an example of network elements in the network infrastructure that are used to trace the path from the gateway element to the rogue access point. A gateway 410 provides a link between the layer-2 network used in the network infrastructure 130 and a layer-3 network used to communicate with other computing devices (e.g., management entity 150). A switch 420 connects the gateway 410 to the compromised switch 132. Switch 430 is connected to a managed access point 142 as well as switches 432 and 434. Switch 432 is connected to the gateway 410 and to another switch 436.

In one example, the management entity 150 may determine a layer-3 network address for the gateway element 410 through a Reverse Address Resolution Protocol in order to access the layer-2 network elements shown in FIG. 4. The management entity 150 may log in to a network element (e.g., gateway 410, switch 432, etc.) using a Secure Shell (SSH) or Simple Network Management Protocol (SNMP). From the gateway 410, the rogue detection logic 155 may traverse through the switches 420 and 132 using the wireless client's network address (e.g., C-MAC) and information in a neighbor table that correlates network addresses for neighboring network elements with interface/port identifiers. Since there can only be one logical path in the layer-2 network from the gateway to the rogue access point 120, the management entity will not encounter any open loops in tracing the path from neighbor to neighbor.

In another example, the rogue detection logic 155 logs in to the gateway 410 and searches a dynamic MAC address table to find out from which interface (e.g., S-INTF-1) the gateway receives packets from the MAC address of the wireless client 110 (e.g., C-MAC). From the neighbor table in the gateway 410, the rogue detection logic 155 determines that switch 420 is connected to the port S-INTF-1. The rogue detection logic 155 logs in to switch 420 and repeats the process to determine the next hop in the path back to the compromised switch 132. Once the rogue detection logic 155 has logged in to the compromised switch 132, it determines the compromised port leading to the rogue access point 120, and may disable the compromised port.

In a further example, the managed access point 142 may send a probe packet to the rogue access point 120 while spoofing the source MAC address as the MAC address of the wireless client 110 (e.g., C-MAC) and using the gateway MAC address (e.g., GW-MAC) as a destination address. Additionally, the rogue detection logic 155 may cause the gateway 410 to send a layer-2 packet along the traced path (e.g., with a destination MAC address of the wireless client 110), and determine if the rogue access point 120 transmits the packet to verify the identity of the compromised port.

Figure 5:
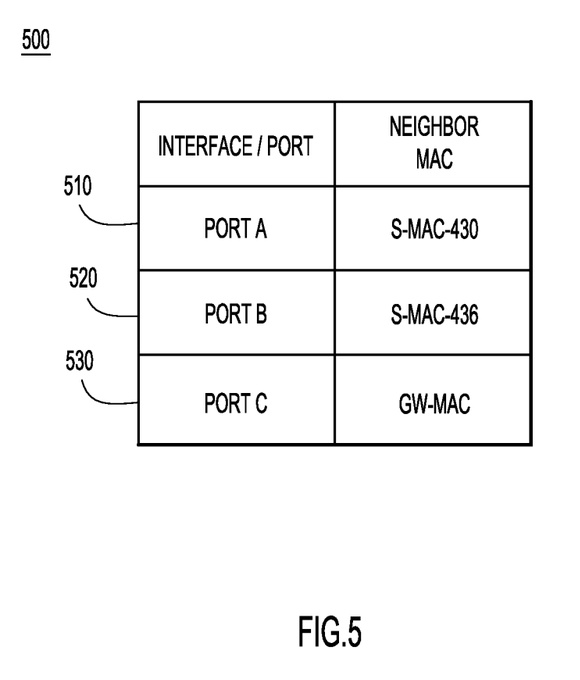
FIG. 5 illustrates a neighbor table that is used to trace a path to a rogue access point, according to an example embodiment.

Referring now to FIG. 5, and with continued reference to FIG. 4, a neighbor table 500 stored in switch 432 is shown. The neighbor table 500 stored in the switch 432 correlates all of the network devices that are connected to the switch 432. Entry 510 indicates that Port A of the switch 432 connects to a network device that uses a MAC address of S-MAC-430, which is the network address of the switch 430. Entry 520 indicates that Port B of the switch 432 connects to a network device that uses a MAC address of S-MAC-436, which is the network address of the switch 436. Entry 530 indicates that Port C of the switch 432 connects to a network device that uses a MAC address of GW-MAC, which is the network address of the gateway 410. The neighbor table 500 may be part of an overall scheme to distribute network information, such as the Cisco Discovery Protocol. As such, the neighbor table 500 may include additional information (e.g., operating system version, device type/model, virtual network parameters, and other device specific information) that may or may not assist in detecting rogue access points.

Figure 6:
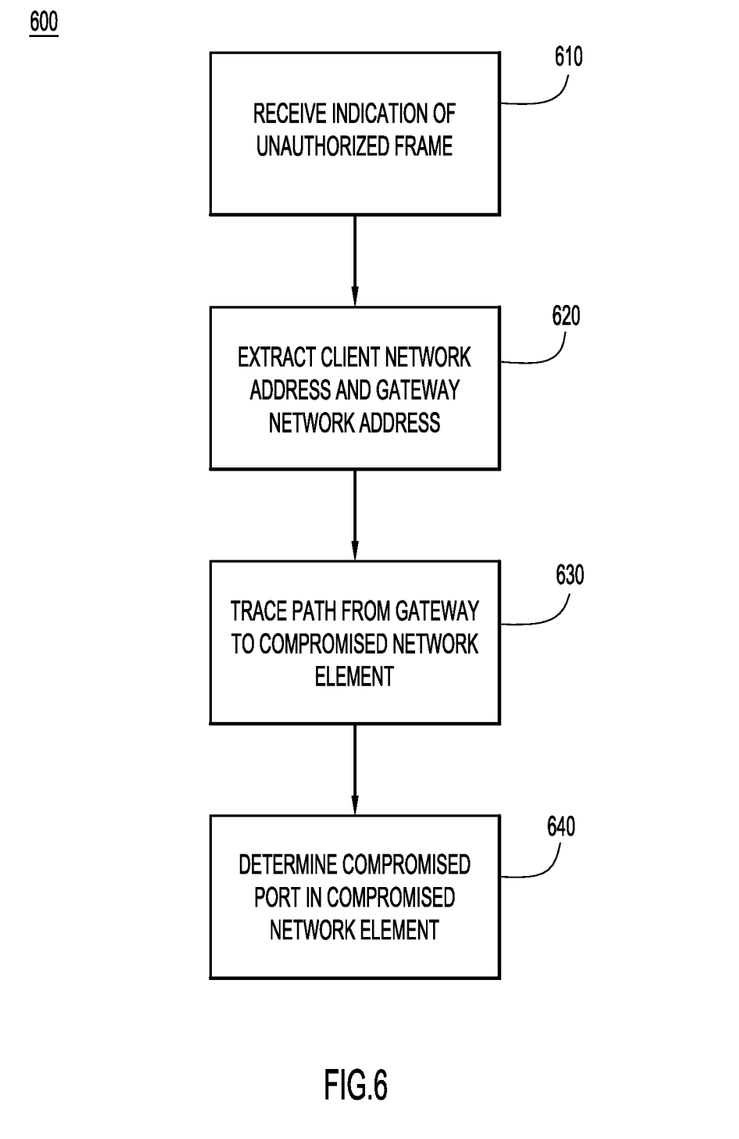
FIG. 6 is a flowchart showing operations performed by the management entity in detecting a rogue access point, according to an example embodiment.

Referring now to FIG. 6, a flowchart is shown of an example process 600 of the operations of the management entity in locating a rogue access point. In step 610, the management entity receives an indication of an unauthorized frame wirelessly intercepted by a managed access point. The managed access point may pass an intercepted frame to a wireless network controller that determines whether the frame is authorized to access the network infrastructure. If the controller determines that the frame is unauthorized, it may send all or part (e.g., an unencrypted header portion) to the management entity for further analysis.

In step 620, the management entity processes the indication of the unauthorized frame and extracts a network address for the wireless client and a network address for a gateway network element. In one example, the network addresses are MAC addresses. In step 630, the management entity begins at the gateway element and traces the path through the network infrastructure that packets from the client device take. The management entity may use the network address of the client device to trace the path from the gateway network element to the compromised network element that is connected to the rogue access point. In step 640, the management entity determines the port in the compromised network element that connects to the rogue access point, so that it can send a command to disable the compromised port. Alternatively, the management entity may inform a user of the compromised port based on settings provided by the network administrator.

Figure 7:
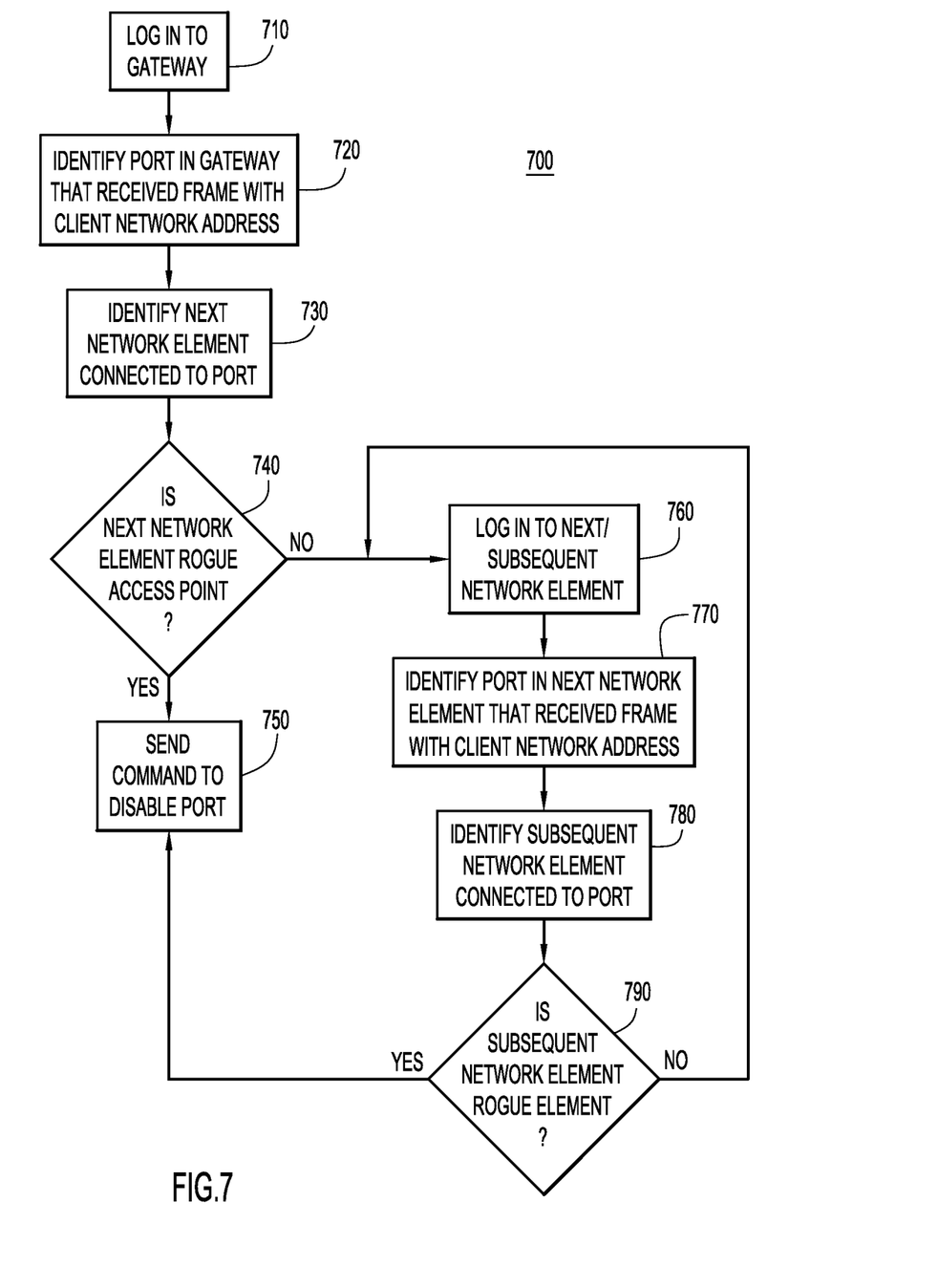
FIG. 7 is a flowchart showing operations performed by the management entity in disabling a port used by a rogue access point, according to an example embodiment.

Referring now to FIG. 7, a flowchart is shown of an example process 700 of the operations of the management entity 150 in disabling the port of the compromised port that leads to the rogue access point. In step 710, the management entity logs in to the gateway element by using the network address extracted from the header of the unauthorized frame. In one example, the management entity looks up an IP address associated with a MAC address that was extracted from the unauthorized frame and uses SSH or SNMP to log in to the gateway. The IP/MAC address correlation may be stored in a table that is pre-populated from the network devices. In step 720, the management entity identifies which port in the gateway sends and receives packets with the client device network address. In one example, the MAC address of the client device is looked up in a content addressable memory table to find the peer switch port.

In step 730, the management entity identifies the network element that connects to the port identified that was in step 720. In one example, the management entity looks up the port in a neighbor table (e.g., as created and saved by the Cisco Discovery Protocol) to determine the MAC address and/or IP address of the next network element in the path to the client device. If the next network element is the rogue access point, as determined in step 740, then the management entity disables the port in step 750 in order to isolate the rogue access point from the rest of the network infrastructure. In one example, the management entity determines if the next network element is the rogue access point by comparing the MAC address of the next network element to a list of MAC addresses of network elements that make up the managed network infrastructure.

If the management entity determines that the next network element is not the rogue access point, then it repeats the process for the next network element. The management entity logs in to the next network element in step 760, and identifies the port used to send/receive packets with the client device's network address in step 770. In step 780, the management entity identifies a subsequent network element that is connected to the port identified in step 770. Until the management entity determines, in step 790, that the next network element is the rogue access point, the management entity continues to log in to each subsequent network element and trace the port and next network element in the path back to the rogue access point. Once the management entity determines that the next network element is the rogue access point, then the management entity sends a command to the compromised network element to disable the compromised port that is connected to the rogue access point.

In summary, the techniques presented herein improve wired rogue access point detection and containment by using the networking infrastructure to trace the path form the gateway to the rogue access point based on an overheard wireless frame. Information about the wireless side of the rogue access point, e.g., obtained from the overheard wireless frame, is used to shut down the wired connection to the rogue access point. The detection rate of rogue access points is improved without requiring additional resources (e.g., dedicated access points, special packets, extra bandwidth, etc.). Additionally, the containment of the rogue access point occurs from the wired side, and does not require over the air containment techniques, which may become obsolete with later standards such as 802.11w.

The rogue detection algorithm presented herein uses the MAC address of the wireless client and gateway to find the network link where the rogue access point is connected, and then uses switch port tracing to shut that port.

In one form, a computer-implemented method is provided for a management entity to detect where a rogue access point is connected to the network infrastructure. The method comprises receiving from a wireless network controller an indication of an unauthorized frame wirelessly intercepted by an authorized access point. The unauthorized frame carries data between a rogue access point and a wireless client device. The rogue access point is connected to a compromised network element in a managed network at a compromised port of the compromised network element. The management entity extracts a client network address and a gateway network address from the indication of the unauthorized frame. The management entity traces a path through the managed network from a gateway network element associated with the gateway network address to the compromised network element. The management entity determines the compromised port in the compromised network element at which the rogue access point is connected.

In another form, an apparatus is provided comprising a network interface unit and processor is provided for detecting where a rogue access point is connected to the network infrastructure. The network interface unit is configured to communicate with computing devices on one or more networks. The processor is configured to receive from a wireless network controller via the network interface unit, an indication of an unauthorized frame wirelessly intercepted by an authorized access point. The unauthorized frame carries data between a rogue access point and a wireless client device. The rogue access point is connected to a compromised network element in a managed network at a compromised port of the compromised network element. The processor is configured to extract a client network address and a gateway network address from the indication of the unauthorized frame. The processor is further configured to trace a path through the managed network from the gateway network element associated with the gateway network address to the compromised network element. The processor is also configured to determine the compromised port in the compromised network element at which the rogue access point is attached.

In yet another form, a rogue access point detection system is provided. The system comprises a managed network, a management entity, and a network controller. The managed network includes one or more authorized access points configured to provide network access to a wireless client device and wirelessly intercept an unauthorized frame carrying data between a rogue access point and the wireless client device. The network controller is configured to control the managed network and send an indication of the unauthorized frame to the management entity. The management entity is configured to extract a client network address and a gateway network address from the indication of the unauthorized frame. The management entity is further configured to trace a path through the managed network from a gateway network element associated with the gateway network address to a compromised network element. The management entity is also configured to determine a compromised port in the compromised network element at which the rogue access point is connected to the managed network.

The above description is intended by way of example only. Various modifications and structural changes may be made therein without departing from the scope of the concepts described herein and within the scope and range of equivalents of the claims.

What is claimed is:
1. A method comprising:
receiving from a wireless network controller an indication of an unauthorized frame wirelessly intercepted by an authorized access point, the unauthorized frame carrying data between a rogue access point and a wireless client device, wherein the rogue access point is connected to a compromised network element in a managed network at a compromised port of the compromised network element;
extracting a client network address and a gateway network address from the indication of the unauthorized frame;
tracing a path through the managed network from a gateway network element associated with the gateway network address to the compromised network element;
identifying a port of the gateway network element, the port of the gateway network element associated with the client network address;
identifying a next-hop network element that communicates through the port of the gateway network element;
determining whether the next-hop network element is the rogue access point;
responsive to a determination that the next-hop network element is the rogue access point, sending a command to disable the port of the gateway network element;
responsive to a determination that the next-hop network element is not the rogue access point, until a subsequent next-hop network element is determined to be the rogue access point:
identifying a port of the next-hop network element, the port of the next-hop network element associated with the client network address;
identifying the subsequent next-hop network element that communicates through the port of the next-hop network element;
determining whether the subsequent next-hop network element is the rogue access point;
repeating the identifying the subsequent next-hop network element and determining until the subsequent next-hop network element is determined to be the rogue access point; and
sending a command to disable the port that communicates with the subsequent next-hop network element that is determined to be the rogue access point.

2. The method of claim 1, further comprising logging into the gateway network element using a Secure Shell or Simple Network Management Protocol.

3. The method of claim 1, wherein the indication comprises an unencrypted header of the unauthorized frame.

4. The method of claim 1, wherein the client network address and the gateway network address are Media Access Control (MAC) addresses and the managed network includes a layer-2 network.

5. The method of claim 1, wherein the gateway network element includes a neighbor table that correlates an address of the next-hop network element to the port of the gateway network element.

6. The method of claim 1, wherein identifying the next-hop network element comprises querying a listing of neighboring network elements.

7. The method of claim 1, further comprising:
determining a layer-3 network address for the gateway network element through a Reverse Address Resolution Protocol.

8. An apparatus comprising:
a network interface unit configured to communicate with computing devices on one or more networks; and
a processor configured to:
receive from a wireless network controller via the network interface unit, an indication of an unauthorized frame wirelessly intercepted by an authorized access point, the unauthorized frame carrying data between a rogue access point and a wireless client device, wherein the rogue access point is connected to a compromised network element in a managed network at a compromised port of the compromised network element;
extract a client network address and a gateway network address from the indication of the unauthorized frame;
trace a path through the managed network from a gateway network element associated with the gateway network address to the compromised network element;
identify a port of the gateway network element, the port of the gateway network element associated with the client network address;
identify a next-hop network element that communicates through the port of the gateway network element;
determine whether the next-hop network element is the rogue access point;
responsive to a determination that the next-hop network element is the rogue access point, send a command to disable the port of the gateway network element;
responsive to a determination that the next-hop network element is not the rogue access point, until a subsequent next-hop network element is determined to be the rogue access point:
identify a port of the next-hop network element, the port of the next-hop network element associated with the client network address;
identify the subsequent next-hop network element that communicates through the port of the next-hop network element;
determine whether the subsequent next-hop network element is the rogue access point;
repeat the identify the subsequent next-hop network element and determine until the subsequent next-hop network element is determined to be the rogue access point; and
send a command to disable the port that communicates with the subsequent next-hop network element that is determined to be the rogue access point.

9. The apparatus of claim 8, wherein the processor is further configured to log into the gateway network element using a Secure Shell or Simple Network Management Protocol.

10. The apparatus of claim 8, wherein the indication comprises an unencrypted header of the unauthorized frame.

11. The apparatus of claim 8, wherein the client network address and the gateway network address are Media Access Control (MAC) addresses and the managed network comprises a layer-2 network.

12. The apparatus of claim 8, wherein the gateway network element includes a neighbor table that correlates an address of the next-hop network element to the port of the gateway network element.

13. The apparatus of claim 8, wherein the processor identifies the next-hop network element by querying a listing of neighboring network elements.

14. The apparatus of claim 8, wherein the processor is further configured to:
determine a layer-3 network address for the gateway network element through a Reverse Address Resolution Protocol.

15. A system comprising:
a managed network comprising one or more authorized access points configured to provide network access to a wireless client device, the one or more authorized access points wirelessly intercepting an unauthorized frame carrying data between a rogue access point and the wireless client device;
a management entity;
a network controller configured to control the managed network and send an indication of the unauthorized frame to the management entity; and
wherein the management entity is configured to:
extract a client network address and a gateway network address from the indication of the unauthorized frame;
trace a path through the managed network from a gateway network element associated with the gateway network address to a compromised network element;
identify a port of the gateway network element, the port of the gateway network element associated with the client network address;
identify a next-hop network element that communicates through the port of the gateway network element;
determine whether the next-hop network element is the rogue access point;
responsive to a determination that the next-hop network element is the rogue access point, send a command to disable the port of the gateway network element;
responsive to a determination that the next-hop network element is not the rogue access point, until a subsequent next-hop network element is determined to be the rogue access point:
identify a port of the next-hop network element, the port of the next-hop network element associated with the client network address;
identify the subsequent next-hop network element that communicates through the port of the next-hop network element;

determine whether the subsequent next-hop network element is the rogue access point;

repeat the identify the subsequent next-hop network element and determine until the subsequent next-hop network element is determined to be the rogue access point; and send a command to disable the port that communicates with the subsequent next-hop network element that is determined to be the rogue access point.

16. The system of claim 15, wherein the indication comprises an unencrypted header of the unauthorized frame.

17. The system of claim 15, wherein the client network address and the gateway network address are Media Access Control (MAC) addresses and the managed network comprises a layer-2 network.

18. The system of claim 15, wherein the management entity is configured to log into the gateway network element using a Secure Shell or Simple Network management Protocol.

19. The system of claim 15, wherein the management entity is configured to identify the next-hop network element by querying a listing of neighboring network elements.

20. The system of claim 15, wherein the management entity is configured to:

determine a layer-3 network address for the gateway network element through a Reverse Address Resolution Protocol.

* * * * *